United States Patent [19]

Noto

[11] Patent Number: 5,731,691
[45] Date of Patent: Mar. 24, 1998

[54] POWER SUPPLY CIRCUITRY FOR A TRANSPONDER AND OPERABLE WITH INFINITESIMAL POWER FROM RECEIVING ANTENNA

[75] Inventor: Hiroyuki Noto, Tokyo, Japan

[73] Assignee: Oki Electric Industry Co., Ltd., Tokyo, Japan

[21] Appl. No.: 683,310

[22] Filed: Jul. 18, 1996

[30] Foreign Application Priority Data

Jul. 21, 1995 [JP] Japan ............... 7-185385

[51] Int. Cl.⁶ ............... G05F 1/10; G01S 13/74
[52] U.S. Cl. ............... 323/220; 342/44
[58] Field of Search ............... 323/220, 229; 342/44

[56] References Cited

U.S. PATENT DOCUMENTS

| | | |
|---|---|---|
| 4,044,303 | 8/1977 | Reindel ............... 324/95 |
| 4,087,791 | 5/1978 | Lemberger . |
| 4,786,907 | 11/1988 | Koelle ............... 342/44 |
| 4,912,471 | 3/1990 | Tyburski et al. . |
| 5,247,305 | 9/1993 | Hirata et al. ............... 342/44 |
| 5,287,113 | 2/1994 | Meier ............... 342/44 |
| 5,305,008 | 4/1994 | Turner et al. . |

FOREIGN PATENT DOCUMENTS 585132  3/1994  European Pat. Off. .

OTHER PUBLICATIONS

A. G. Milnes, "Semiconductor Devices & Integrated Electronics", published 1980, Van Norstrand Reinhold, New York, pp. 178–179.

Primary Examiner—Stuart N. Hecker
Attorney, Agent, or Firm—Wenderoth, Lind & Ponack

[57] ABSTRACT

In a transponder, power supply circuitry is connected to an antenna and a response circuit. DC power to be fed to the response circuit is generated out of an electromagnetic wave come in through the antenna. A rectifier diode has an n type and a p type semiconductor region and is adjusted such that a reverse resistance against a reverse current directed from the n type region toward the p type region is lower than a forward resistance against a forward current directed from the latter region to the former region. A voltage output from the antenna on the receipt of the electromagnetic wave is applied to the rectifier diode, thereby causing a reverse current to flow to the diode. The resulting DC voltage is used to feed power to the response circuit. Even when the electromagnetic wave received from an interrogator is weak, sufficient power can be surely fed to the response circuit.

15 Claims, 9 Drawing Sheets

CURRENT-TO-VOLTAGE CHARACTERISTIC
OF RECTIFIER DIODE

Fig. 2

CURRENT-TO-VOLTAGE CHARACTERISTIC
OF RECTIFIER DIODE

Fig. 3

MAX RECEIVED VOLTAGE AMPLITUDE
VS. POWER FED

Fig. 4

CURRENT-TO-VOLTAGE CHARACTERISTIC OF RECTIFIER DIODE

CURRENT-TO-VOLTAGE CHARACTERISTIC
OF RECTIFIER DIODE ized by an antenna gain is low.

POWER SUPPLY CIRCUITRY FOR A TRANSPONDER AND OPERABLE WITH INFINITESIMAL POWER FROM RECEIVING ANTENNA

BACKGROUND OF THE INVENTION

1. Field of the Invention

The present invention relates to power supply circuitry for a transponder and capable of generating out of power received from an interrogator DC power to be fed to a response circuit which outputs information relating to, e.g., the kind and cost of an article in response to the interrogator.

2. Description of the Background Art

EP Publication 0 585 132 A1, for example, discloses a transponder of the type receiving an electromagnetic wave from an interrogator with an antenna, causing its response circuit to output information in response to the received wave, and sending the information to the interrogator via the antenna. Power supply for the response circuit is implemented by the power of the received electromagnetic wave. For this purpose, power supply circuitry has a flywheel coil for transforming the AC power of the received wave to an AC electromotive force. The electromotive force is rectified by a rectifier diode and then smoothed by a smoothing capacitor. The resulting DC power is fed to the response circuit.

Specifically, on receiving the electromagnetic wave from the interrogator via the antenna, the power supply circuitry transforms the power of the received wave to the DC power and feeds the DC power to the response circuit. The DC power enables or activates the response circuit. On the receipt of an interrogation signal from the interrogator, the response circuit demodulates and analyzes it and then outputs information corresponding to the interrogation and stored therein. The information is routed through a coupling capacitor to the antenna and sent to the interrogator via the antenna.

To enable the power supply circuitry of the type described, it is necessary to render the rectifier diode conductive. This cannot be done unless an AC voltage having an amplitude capable of causing a forward current to flow through the rectifier diode is input to the p type semiconductor region of the diode. The minimum voltage amplitude capable of causing the forward current to flow through the diode is dependent on the kind of the diode. For example, the minimum voltage amplitude is higher than about 0.6 V in the case of a silicon diode, or higher than about 0.4 V in the case of a silicon Schottky barrier diode, or higher than about 0.15 V in the case of a germanium diode. It has been customary with power supply circuitry for a transponder to use a rectifier diode having such a relatively high forward conduction voltage. This, however, brings about a problem that to enable the circuitry for feeding power to the response circuit, the maximum amplitude of the voltage of the received signal input to the circuitry must be increased by intensifying the electromagnetic wave to be radiated from the interrogator or by using an antenna having a high voltage gain.

SUMMARY OF THE INVENTION

It is therefore an object of the present invention to provide power supply circuitry for a transponder and capable of feeding DC power to its response circuit even if an electromagnetic wave received from an interrogator is weak or its antenna gain is low.

In accordance with the present invention, power supply circuitry for a transponder is connected to a receiving section for receiving electromagnetic energy and a response circuit connected to the receiving section for transmitting a signal in response to received electromagnetic energy. The power supply circuitry generates DC power to be fed to the response circuit out of the received electromagnetic energy. The power supply circuitry has a first rectifier diode having a junction formed by an n type semiconductor region and a p type semiconductor region. The first rectifier diode is adjusted such that a reverse resistance against a reverse current directed from the p type semiconductor region toward the n type semiconductor region is lower than a forward resistance against a forward current directed from the p type semiconductor region toward the n type semiconductor region. The first rectifier diode is connected between the receiving section and the response circuit. A voltage output from the receiving section received the electromagnetic energy is applied to the first rectifier diode to thereby cause the reverse current to flow through the first rectifier diode. The resulting DC voltage output from the first rectifier diode causes power to be fed to the response circuit.

Also, in accordance with the present invention, a transponder has a receiving section for receiving electromagnetic energy sent from an interrogator. A response circuit is connected to the receiving section for transmitting a signal to the interrogator in response to the electromagnetic energy/ received. Power supply circuitry is connected to said receiving section and response circuit for generating DC power to be applied to the response circuit out of the electromagnetic energy received. The power supply circuitry has a first rectifier diode having a junction formed by an n type semiconductor region and a p type semiconductor region. The first rectifier diode is adjusted such that a reverse resistance against a reverse current directed from the n type semiconductor region toward the p type semiconductor region is lower than a forward resistance against a forward current directed from the p type semiconductor region toward the n type semiconductor region. The first rectifier diode is connected between the receiving section and the response circuit. A voltage output from the receiving section received the electromagnetic energy is applied to the first rectifier diode to thereby cause the reverse current to flow through the first rectifier diode. The resulting DC voltage output from the first rectifier diode causes power to be fed to the response circuit.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
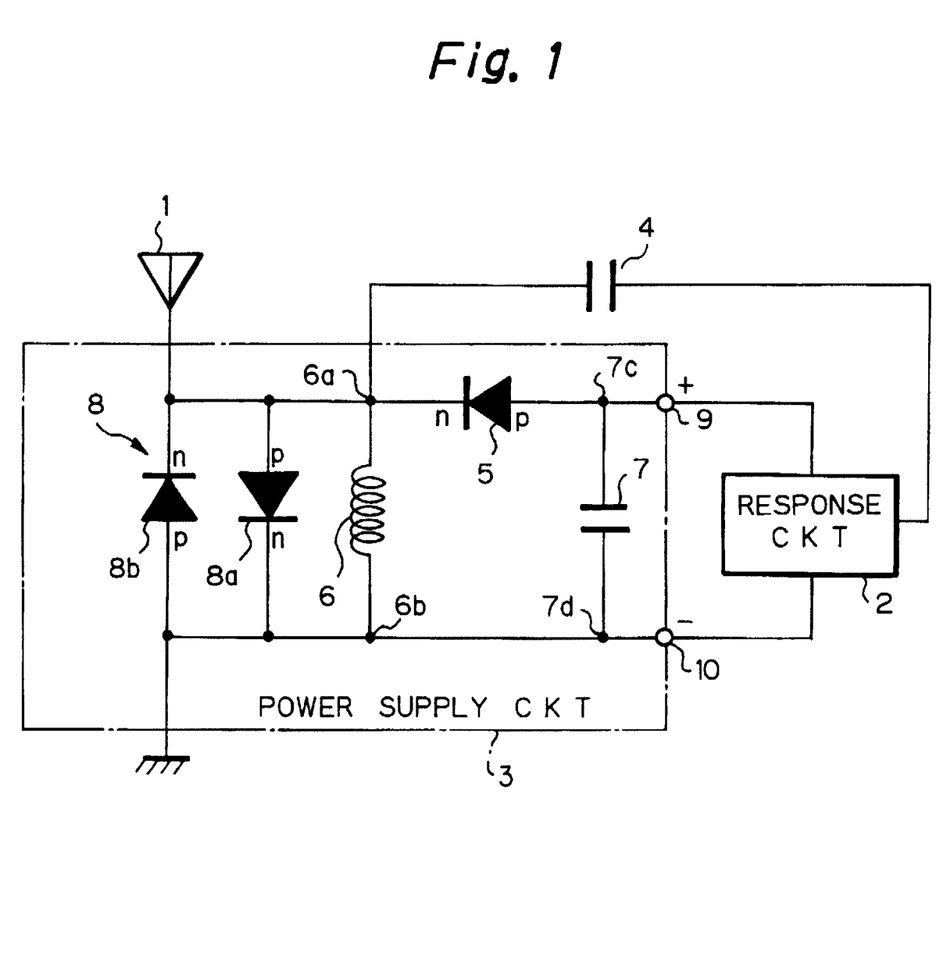
FIG. 1 is a schematic circuit diagram showing a transponder including a preferred embodiment of the power supply circuitry in accordance with the present invention.

Referring to FIG. 1 of the drawings, a transponder including power supply circuitry embodying the present invention is shown. As shown, the transponder has a transmit/receive antenna 1 for receiving an electromagnetic wave sent from an interrogator, not shown, and for sending a signal to the interrogator. A response circuit 2 outputs, in response to the received electromagnetic wave or signal, a signal based on information stored therein. The power supply circuitry, generally 3, is also responsive to the received signal for generating DC power to be fed to the response circuit 2. The signal output from the response circuit 2 is routed through a coupling capacitor 4 to the antenna 1 and radiated via the antenna 1.

The circuitry 3 includes a reverse diode or similar rectifier diode 5 having a junction formed by an n type and a p type semiconductor region. The rectifier diode 5 is adjusted such that a reverse resistance against a reverse current directed from the n type semiconductor region toward the p type semiconductor region is lower than a forward resistance against a forward current directed from the latter region toward the former region. Assume a reverse and a forward resistance against a reverse and a forward current, respectively, having the same value at least smaller than the mean load current of the response circuit 2. Then, the reverse resistance of the diode 5 is lower than the forward resistance of the same. The reverse conduction mechanism of the diode 5 may be implemented by the conventional avalanche effect or the tunnel effect. The n type region of the diode 5 is connected to the antenna 1 while the p type region of the diode 5 is connected to the response circuit 2 via a terminal 9.

Figure 2:
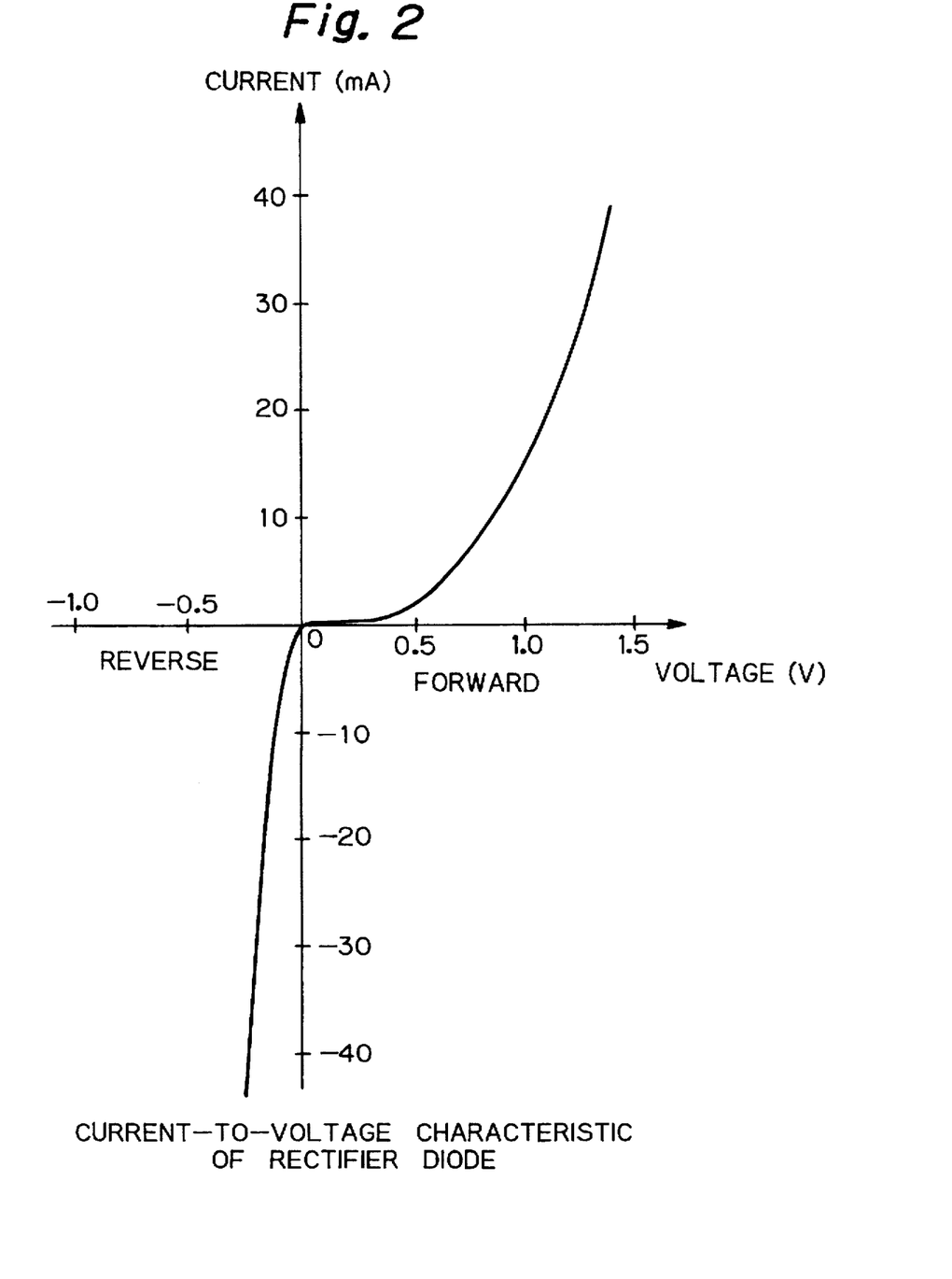
FIG. 2 is a graph showing a specific current-to-voltage characteristic of a rectifier diode included in the embodiment shown in FIG. 1.
Figure 10:
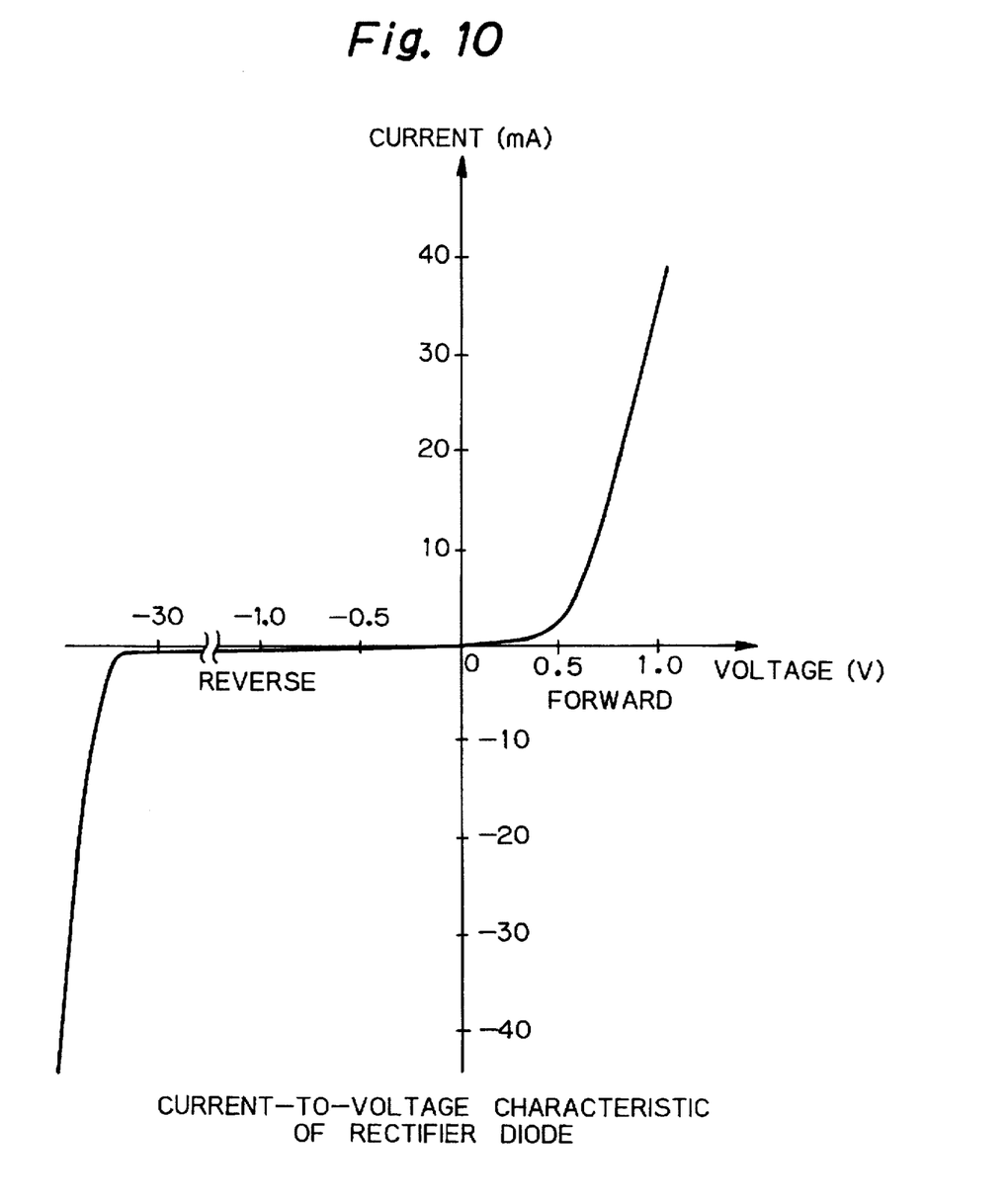
FIG. 10 is a graph representative of a specific current-to-voltage characteristic particular to an ordinary diode.

Generally, a semiconductor diode has a forward voltage drop characteristic dependent on the kind of a semiconductor used. For example, a silicon diode has such a characteristic that the forward current sharply increases when a forward voltage applied to the diode rises above about 0.6 V, as shown in FIG. 10 specifically. On the other hand, the semiconductor diode can be provided with any desired reverse voltage drop characteristic if its impurity content is adjusted on the production line. FIG. 2 shows a specific current-to-voltage characteristic available with the rectifier diode 5 included in the power supply circuit 3. As shown, the reverse breakdown voltage is close to 0 V. This kind of semiconductor diode, as distinguished from an "ordinary" diode whose forward resistance is lower than the reverse resistance, can be produced if the impurity content is increased in both the p type region and the n type region so as to set up a field strength of the p-n junction higher than that of the "ordinary" diode on the application of a reverse current.

Referring again to FIG. 1, the circuitry 3 further includes a flywheel coil 6 and a smoothing capacitor 7. The flywheel coil 6 allows a pulsation derived from the rectification of the diode 5 to pass therethrough. The smoothing capacitor 7 smoothes the rectified voltage and stores the resulting power therein. The coil 6 is connected at one end 6a to the n type region of the rectifier diode 5 and at the other end 6b to a reference potential, e.g., ground. The capacitor 7 is connected at one end 7c to the p type region of the rectifier diode 5 and at the other end to the above reference potential, e.g., ground.

A limiter circuit 8 has two ordinary diodes 8a and 8b each having a forward resistance lower than a reverse resistance, as stated earlier. The limiter circuit 8 limits the voltage to be applied to the n type region of the rectifier diode 5. Basically, the diodes or protection diodes 8a and 8b may have an identical current-to-voltage characteristic, e.g., the characteristic shown in FIG. 10; the forward current sharply increases when the forward voltage rises above about 0.6 V. The protection diode 8a has its p type semiconductor region and n type semiconductor region connected to the n type region of the rectifier diode 5 and ground, respectively. The other protection diode 8 has its n type semiconductor region and p type semiconductor region connected to the n type region of the rectifier diode 5 and ground, respectively.

In operation, an electromagnetic wave radiated from the interrogator is received by the antenna 1 and causes an AC electromotive force to occur at one end 6a of the flywheel coil 6. The electromotive force causes a reverse current and a forward current smaller than the reverse current to flow alternately. As a result, a pulsation corresponding to a difference between the reverse and forward currents is generated. The pulsation is smoothed by the smoothing capacitor 7. Consequently, a positive (+) and a negative (−) DC voltage appear on the terminal 9 and a terminal 10, respectively. The response circuit 2 is enabled by the positive and negative DC voltages. Specifically, the response circuit 2 demodulates and analyzes the received signal and outputs information corresponding to the received signal and stored therein. The information is routed through the coupling capacitor 4 to the antenna 1 and radiated in the form of an electromagnetic wave via the antenna 1.

Figure 4:
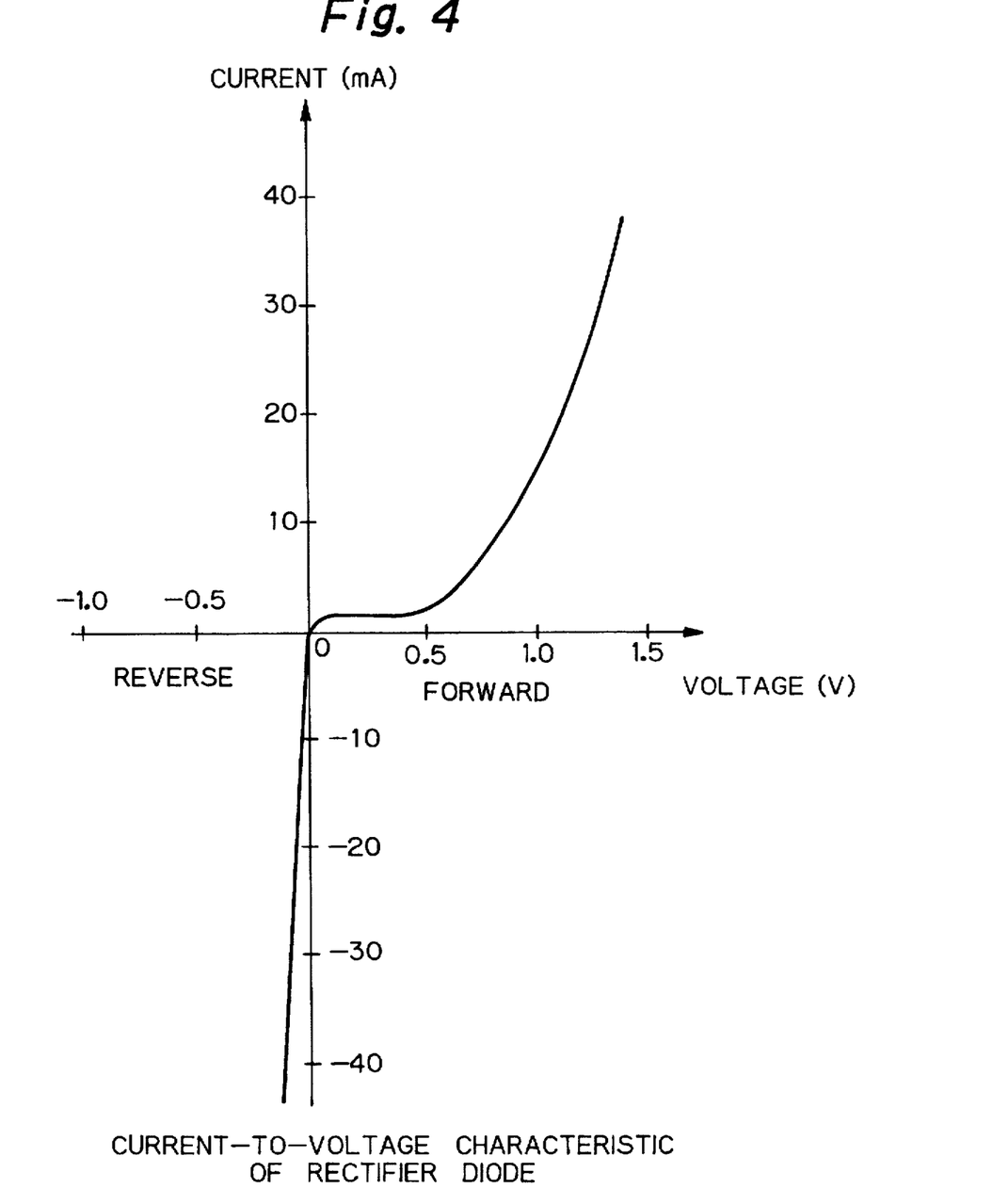
FIG. 4 is a graph showing another specific current-to-voltage characteristic of the rectifier diode included in the embodiment of FIG. 1.

FIG. 4 shows another specific current-to-voltage characteristic of the rectifier diode 5. As shown, the diode 5 is again adjusted such that the reverse resistance against the reverse current directed from the n type region toward the p type region is lower than the forward current directed from the latter region to the former region. While the characteristic described with reference to FIG. 2 has a reverse breakdown voltage of about 0 V, the characteristic shown in FIG. 4 has a breakdown voltage at the positive side (about 0.1 V in FIG. 4).

Figure 9:
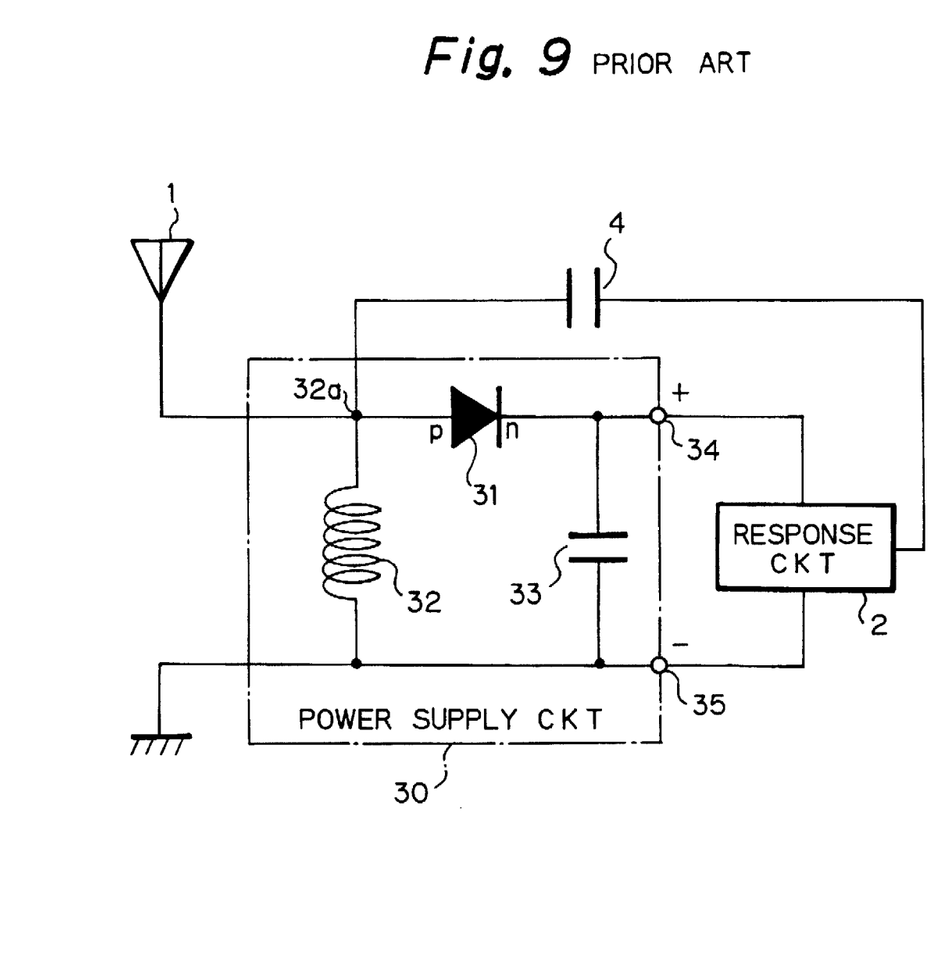
FIG. 9 is a :schematic circuit diagram showing a conventional transponder.

The illustrative embodiment will be compared with a conventional transponder shown in FIG. 9. As shown, the conventional transponder has power supply circuitry 30 in addition to the transmit/receive antenna 1, response circuit 2, and coupling capacitor 4. The antenna 1 receives an electromagnetic wave from an interrogator, not shown, and transmits an electromagnetic wave to the interrogator. The response circuit 2 outputs, in response to the received signal, a signal based on information stored therein. The circuitry 30 feeds DC power to the response circuit 2. The signal output from the response circuit 2 is fed to the antenna 1 via the coupling capacitor 4. The circuitry 30 is made up of a rectifier diode 31, a flywheel coil 32 and a smoothing capacitor 33 connected together, as illustrated. The rectifier diode 31 has its p type semiconductor region connected to the antenna 1. The flywheel coil 32 allows a pulsation derived from the rectification of the diode 31 to pass therethrough. The smoothing capacitor 33 smoothes the rectified voltage. The diode 31 is implemented by the previously mentioned "ordinary" diode having the current-to-voltage characteristic shown in FIG. 10.

The operation of the conventional transponder is as follows. An electromagnetic wave, radiated from interrogator is received by the antenna 1 and causes an AC electromotive force to occur at one end 32a of the flywheel coil 32. The AC electromotive force is rectified by the rectifier diode 31. A rectified voltage output from the rectifier 31 is smoothed by the smoothing capacitor 33. As a result, a positive and a negative DC voltage respectively appear on terminals 34 and 35 and enable the response circuit 2. The response circuit 2 demodulates and analyzes the received signal fed from the antenna 1 and outputs corresponding information stored therein. The information is delivered to the antenna 1 via the coupling capacitor 4.

Figure 3:
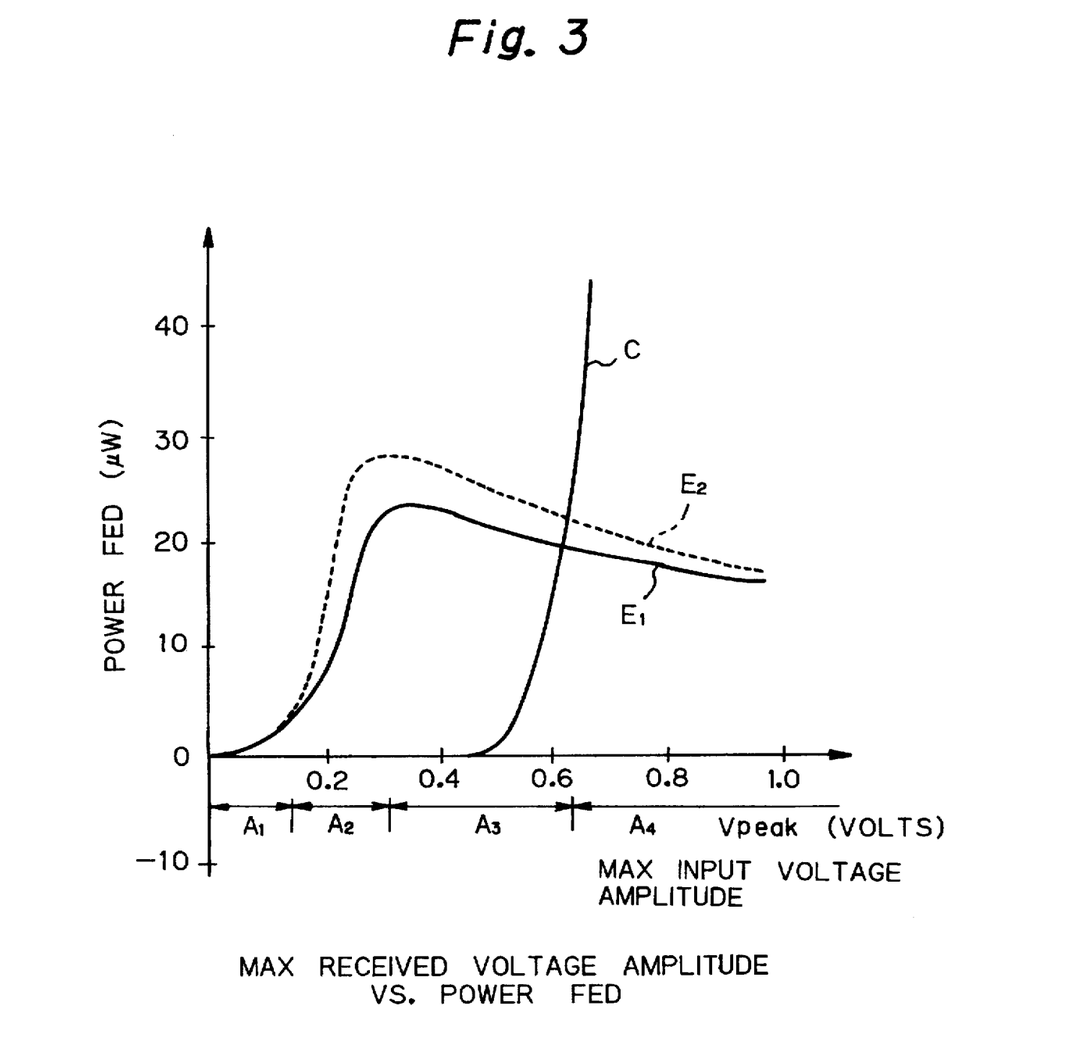
FIG. 3 is a graph comparing the embodiment of FIG. 1 and a conventional transponder with respect to a relation between the maximum amplitude of a voltage and power actually fed.

FIG. 3 is a graph comparing the illustrative embodiment and the conventional power supply circuit 30 (FIG. 9) with respect to a relation between the maximum amplitude $V_{peak}$ (V) of the voltage input to the antenna 1 and the power ($\mu$W) fed to the response circuit 2. In FIG. 3, curves $E_1$ and $E_2$ are each representative of the characteristic of the embodiment while a curve C is representative of the characteristic of the conventional circuitry 30. As the curve C indicates, in ranges $A_1$ and $A_2$ in which the maximum amplitude $V_{peak}$ of the voltage input to the antenna 1 is low, the conventional circuitry 30 causes hardly any forward current to flow through the rectifier diode 31, and therefore causes hardly any power to be input to the response circuit 2. By contrast, as the curve $E_1$ indicates, the power supply circuitry 3 (FIG. 2) whose rectifier diode 5 has the characteristic shown in FIG. 2 allows a reverse current to flow through the diode 5 even in the range $A_2$ in which the maximum amplitude $V_{peak}$ is low. It follows that the embodiment is capable of feeding sufficiently great DC power to the response circuit 2.

As the curve $E_1$ further indicates, when the maximum amplitude of the voltage input to the n type region of the rectifier diode 5 exceeds 0.3 V (regions $A_1$ and $A_4$), power fed to the response circuit 2 decreases. This is because when the maximum amplitude $V_{peak}$ of the voltage input to he antenna 1 rises above 0.3 V, the forward current flowing through the rectifier diode 5 begins to increase. In the illustrative embodiment, the limiter circuit 8 limits the amplitude of the voltage input to the n type region of the diode 5. This ;successfully reduces the fall of the power ascribable to the forward current flowing through the diode 5, even if the maximum amplitude of the voltage output from the antenna 1 exceeds 0.3 V (regions $A_3$ and $A_4$).

The curve $E_2$ shown in FIG. 3 is representative of another specific characteristic of the rectifier diode 5 and derived from the voltage-to-current characteristic shown in FIG. 4. It will be seen that with the characteristic of FIG. 4 it is possible to feed greater power at large than with the characteristic of FIG. 2.

The embodiment receives electromagnetic waves with its antenna 1 located in a radiation electromagnetic field. If desired, the antenna 1 may be replaced with an arrangement which receives electromagnetic energy by being coupled to the interrogator by electromagnetic coupling, electromagnetic induction or microwave. The rectifier diode 5 may be formed of a semiconductor other than silicon and having a great difference between a forward resistance and a reverse resistance, e.g., a compound semiconductor or an organic semiconductor.

Figure 5:
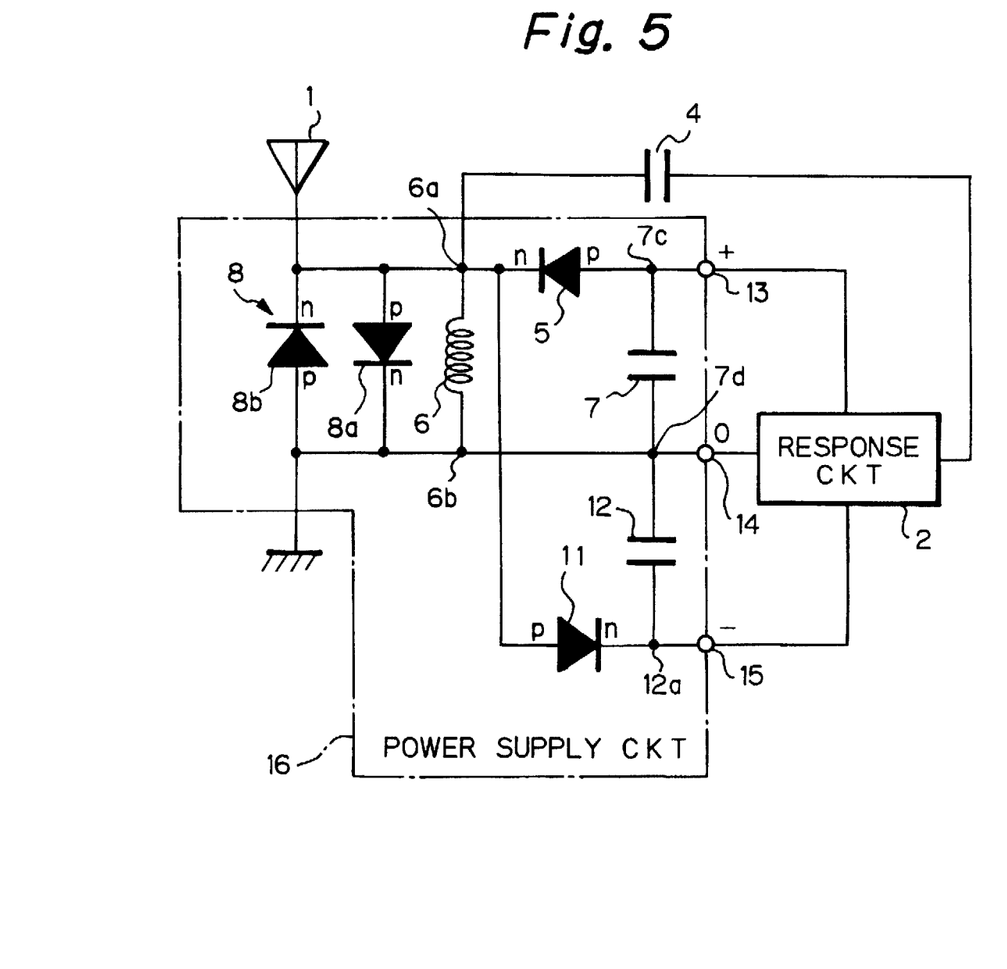
FIG. 5 is a schematic circuit diagram showing a transponder including an alternative embodiment of the present invention.

Referring to FIG. 5, a transponder including an alternative embodiment of the present invention will be described. In FIG. 1, the same constituent parts as shown in FIG. 1 are designated by like reference numerals, and a detailed description thereof will not be made in order to avoid redundancy. As shown, power supply circuitry 16 includes a rectifier diode 11 in addition to the rectifier diode 5. The diode 5 has substantially the same characteristic as the diode 11, i.e., the specific current-to-voltage characteristic shown in FIG. 2 or 4. The power supply circuitry 16 further includes a capacitor 12 in addition to the capacitor 7. The capacitors 7 and 12 are substantially identical in characteristic with each other.

The rectifier diode 5 has its p type semiconductor region connected to the response circuit 2 via a terminal 13 and has its p type semiconductor region connected to the antenna 1. The other rectifier diode 11 has a p type semiconductor region connected to the n type region of the diode 5 and has an n type semiconductor region connected to the response circuit 12 via one end 12a of the capacitor 12 and a terminal 15. The other end 7d of the capacitor 12 is connected to ground and connected to the response circuit 2 via a terminal 14. The rectifier diodes 5 and 11 and capacitors 7 and 12 play the role of a full-wave double voltage rectifying circuit in combination.

In operation, an electromagnetic wave sent from an interrogator, not shown, is received by the antenna 1 and causes an AC electromotive force to occur at one end 6a of the flywheel coil 6. The AC electromotive force causes a reverse current and a forward current smaller than the reverse current to flow through one rectifier diode 11 alternately. As a result, a pulsation corresponding to a difference between the reverse and forward currents is generated. The pulsation is smoothed by one smoothing capacitor 12 and turns out a negative DC voltage on the terminal 15. In response to the DC voltage, the response circuit 2 demodulates and analyzes the received signal and outputs corresponding information stored therein. The information is fed to the antenna 1 via the coupling capacitor 4 and radiated via the, antenna 1. With this embodiment, it is possible to feed sufficiently great DC power to the response circuit 2 even if the maximum amplitude of the voltage received by the antenna 1 is small. As for the rest of the construction, this embodiment may be identical with the embodiment shown in FIG. 1.

Figure 6:
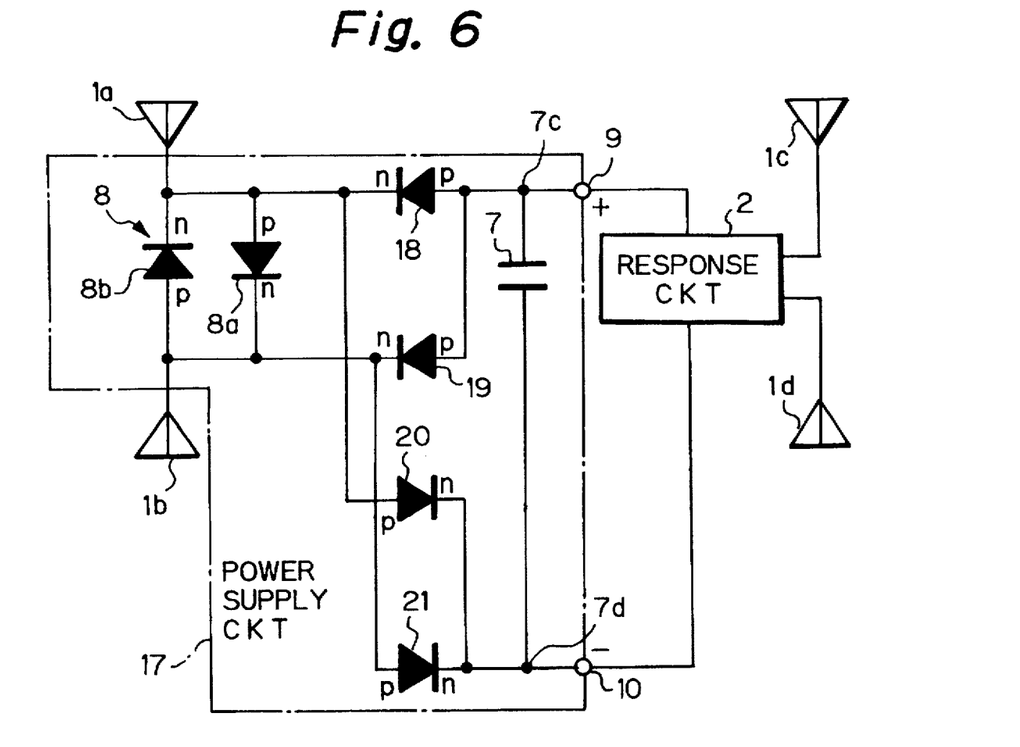
FIG. 6 is a schematic circuit diagram showing a transponder including another alternative embodiment of the present invention.

FIG. 6 shows a transponder including another alternative embodiment of the present invention. In FIG. 6, the same constituent parts as the constituent parts shown in FIG. 1 are designated by like reference numerals, and a detailed description thereof will not be made in order to avoid redundancy. As shown, power supply circuitry 17 includes four rectifier diodes 18, 19, 20 and 21 having substantially the same characteristic, i.e., adjusted such that the reverse resistance is lower than the forward resistance. The diodes 18–21 constitute a bridge rectifier circuit, and each has the current-to-voltage characteristic shown in FIG. 2 or 4.

The transponder shown in FIG. 6 has two antennas 1a and 1b for receipt and two antennas 1c and 1d for transmission. The receive antenna 1a is connected to the n type semiconductor region of the rectifier diode 18 and the p type semiconductor region of the rectifier diode 20. The other receive antenna 1b is connected to the n type semiconductor region of the rectifier diode 19 and the p type semiconductor region of the rectifier diode 21. The transmit antennas 1c and 1d are both connected to the output of the response circuit 2.

In operation, an electromagnetic wave sent from an interrogator, not shown, is received by the receive antennas 1a and 1b and causes an AC electromotive force to occur. The AC electromotive force causes a reverse current and a forward current smaller than the reverse current to flow through the rectifier diodes 18–21. As a result, a pulsation corresponding to a difference between the reverse and forward currents is generated. The pulsation is smoothed by the smoothing capacitor 7 and causes a positive DC voltage and a negative DC voltage to appear on the terminals 9 and 10, respectively. In response to the DC voltages, the response circuit 2 demodulates and analyzes the received signal and outputs corresponding information stored therein. The information is sent to the interrogator via the transmit antennas 1c and 1d. This embodiment is also capable of feeding sufficiently great DC power to the response circuit 2 even when the maximum amplitude of the voltage input from the receive antennas 1a and 1b is small. As for the rest of the construction, this embodiment may also be identical with the embodiment shown in FIG. 1.

Figure 7:
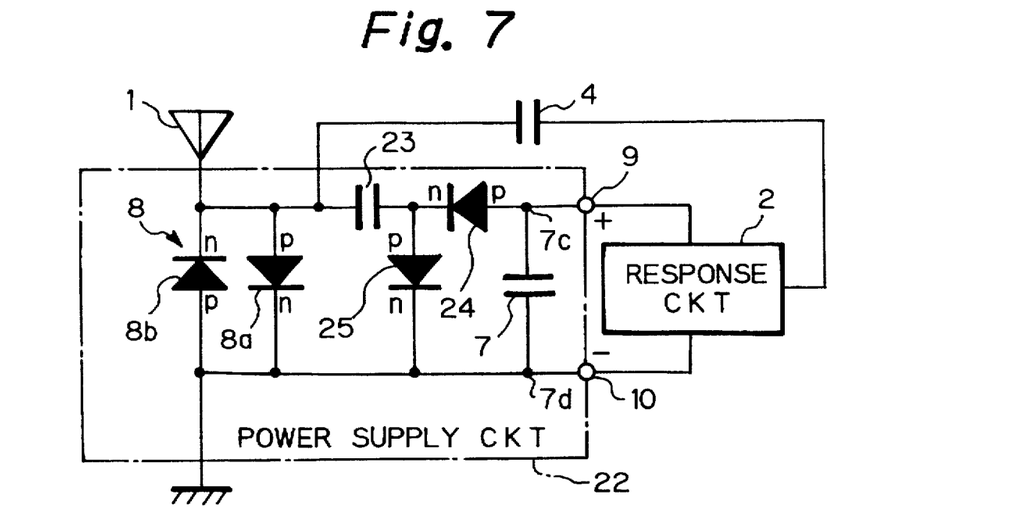
FIG. 7 is a schematic circuit diagram showing a transponder including still another alternative embodiment of the present invention.

FIG. 7 shows a transponder including still another alternative embodiment of the present invention. In FIG. 7, the same constituent parts as the constituent parts shown in FIG. 1 are designated by like reference numerals, and a detailed description thereof will not be made in order to avoid redundancy. As shown, power supply circuitry 22 has an additional capacitor 23 and two rectifier diodes 24 and 25 having substantially the same characteristic, i.e., adjusted such that the reverse resistance is lower than the forward resistance. The rectifier diodes 24 and 25 have the current-to-voltage characteristic shown in FIG. 2 or 4 and constitute a double voltage rectifying circuit.

In operation, an electromagnetic wave sent from an interrogator, not shown, is received by the antenna 1 and causes an AC electromotive force to occur. The AC electromotive force causes a reverse current and a forward current smaller than the reverse current to flow through the rectifier diodes 24 and 25. As a result, a pulsation corresponding to a difference between the reverse and forward currents is generated. The pulsation is smoothed by the smoothing capacitor 7 and causes a positive and a negative DC current to appear on the terminals 9 and 10, respectively. In response to the DC voltages, the response circuit 2 demodulates and analyzes the received signal and outputs corresponding information stored therein. The information is routed through the coupling capacitor 4 to the antenna 1 and sent to the interrogator via the antenna 1. In this configuration, even when the maximum amplitude of the voltage input from the antenna 1 is small, sufficiently large DC power can be fed to the response circuit 2, as in the previous embodiments. As for the rest of the construction, this embodiment may also be identical with the embodiment shown in FIG. 1.

Figure 8:
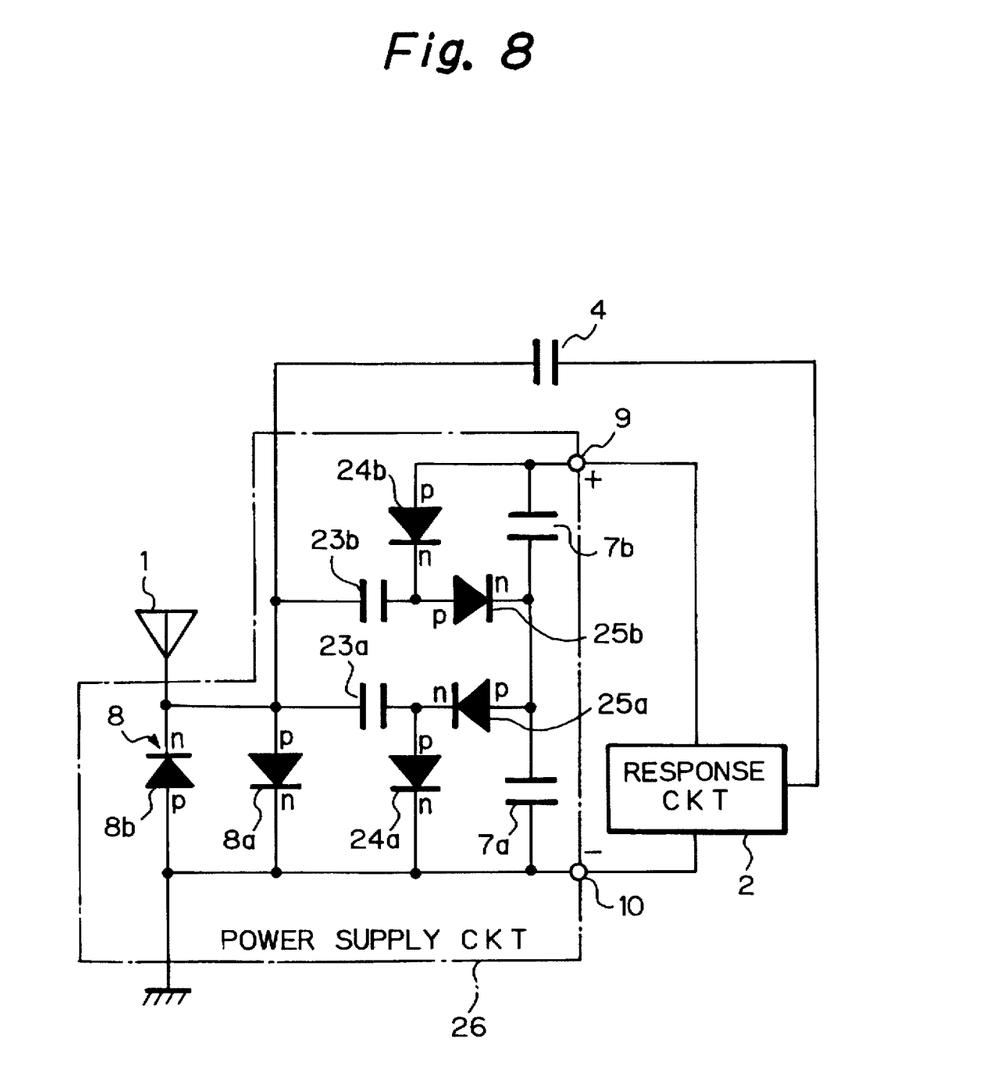
FIG. 8 is a schematic circuit diagram showing a transponder including a further alternative embodiment of the present invention.

FIG. 8 shows a transponder including a further alternative embodiment of the present invention. In FIG. 8, the same constituent parts as the constituent parts shown in FIG. 1 are designated by like reference numerals, and a detailed description thereof will not be made in order to avoid redundancy. As shown, power supply circuitry 26 has a pair of additional capacitors 23a and 23b, two rectifier diodes 24a and 25a, and other two rectifier diodes 24b and 25b. The diodes 24a and 25a and the diodes 24b and 25b have substantially the same characteristic as each other and have the current-to-voltage characteristic shown in FIG. 2 or 4. In the configuration shown in FIG. 8, the diodes 24a and 25a and diodes 24b and 25b constitute a quadruple voltage rectifying circuit in combination with the capacitors 23a and 23b and capacitors 7a and 7b.

In operation, an electromagnetic wave sent from an interrogator, not shown, is received by the antenna 1 and causes an AC electromotive force to occur. The AC electromotive force causes a reverse current and a forward current smaller than the reverse current to flow through the rectifier diodes 24a and 25a and rectifier diodes 24b and 25b. As a result, a pulsation corresponding to a difference between the reverse and forward currents is generated. The pulsation is smoothed by the smoothing capacitor 7a and 7b and causes a positive and a negative DC current to appear on the terminals 9 and 10, respectively. In response to the DC voltages, the response circuit 2 demodulates and analyzes the received signal and outputs corresponding information stored therein. The information is routed through the coupling capacitor 4 to the antenna 1 and sent to the interrogator via the antenna 1. In this configuration, even when the maximum amplitude of the voltage input from the antenna 1 is small, sufficiently large DC power can also be fed to the response circuit 2. As for the rest of the construction, this embodiment may also be identical with the embodiment shown in FIG. 1.

In summary, it will be seen that the present invention provides power supply circuitry for a transponder and capable of feeding sufficient DC power to a response circuit even when an electromagnetic wave received from an interrogator is weak or when an antenna gain is low.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. Power supply circuitry for a transponder and connected to receiving means for receiving electromagnetic energy and a response circuit connected to said receiving means for transmitting a signal in response to received electromagnetic energy, said power supply circuitry generating DC power to be fed to said response circuit out of the received electromagnetic energy, said power supply circuitry comprising:

a first rectifier diode having a junction formed by an n type semiconductor region and a p type semiconductor region, and adjusted such that a reverse resistance against a reverse current directed from said n type semiconductor region toward said p type semiconductor region is lower than a forward resistance against a forward current directed from said p type semiconductor region toward said n type semiconductor region;

said first rectifier diode being connected between said receiving means and said response circuit;

whereby a voltage output from said receiving means received the electromagnetic energy is applied to said first rectifier diode to thereby cause the reverse current to flow through said first rectifier diode, and a resulting DC voltage output from said first rectifier diode causes power to be fed to said response circuit.

2. Power supply circuitry in accordance with claim 1, wherein said n type semiconductor region and said p type semiconductor region of said first rectifier diode are connected to said receiving means and said response circuit, respectively.

3. Power supply circuitry in accordance with claim 1, wherein said first rectifier diode is adjusted such that assuming a forward resistance and a reverse resistance against currents having a same value within a range of a current to be fed to said response circuit, said reverse resistance is lower than said forward resistance.

4. Power supply circuitry in accordance with claim 1, wherein said first rectifier diode comprises a silicon diode, and the reverse voltage of said first rectifier diode is lower than 0.3 V inclusive.

5. Power supply circuitry in accordance with claim 1, further comprising:
- a coil connected at one end to said n type semiconductor region of said first rectifier diode and at the other end to a reference potential; and
- a first capacitor connected at one end to said p type semiconductor region of said first rectifier diode and at the other end to said reference potential.

6. Power supply circuitry in accordance with claim 5, further comprising:
- a second rectifier diode having substantially a same characteristic as said first rectifier diode; and
- a second capacitor having substantially a same characteristic as said first capacitor;
- said second rectifier diode comprising a junction formed by an n type semiconductor region and a p type semiconductor region, wherein said p type semiconductor region and said n type semiconductor region are respectively connected to said n type semiconductor region of said first rectifier diode and one end of said second capacitor;
- the other end of said second capacitor being connected to said reference potential.

7. Power supply circuitry in accordance with claim 1, further comprising a limiter circuit for limiting a voltage to be applied to said n type semiconductor region of said first rectifier diode.

8. Power supply circuitry in accordance with claim 7, wherein said limiter circuit comprises a first protection diode and a second protection diode, wherein said first protection diode has a p type semiconductor region and an n type semiconductor region thereof respectively connected to said n type semiconductor region and an s type semiconductor region of said first rectifier diode and said reference potential, and wherein said second protection diode has an n type semiconductor region and a p type semiconductor region respectively connected to said s type semiconductor region of said first rectifier diode and said reference potential.

9. Power supply circuitry in accordance with claim 8, wherein said first protection diode and said second protection diode each has an ordinary current-to-voltage characteristic.

10. Power supply circuitry in accordance with claim 1, further comprising:
- a capacitor connected between said receiving means and said first rectifier diode; and
- a second rectifier diode connected between said capacitor and said reference potential and having substantially a same characteristic as said first rectifier diode.

11. Power supply circuitry in accordance with claim 1, wherein said first rectifier diode is connected to a positive input of said response circuit, and wherein said power supply circuit further comprises:
- a first capacitor connected between said receiving means and said first rectifier diode;
- a series connection of a second capacitor and a second rectifier diode and connected between said receiving means and a negative input of said response circuit; and
- a series connection of a third rectifier diode and a fourth rectifier diode and connected between a junction between said second capacitor and said second rectifier diode and a junction between said first capacitor and said first rectifier diode, wherein said third rectifier diode and said fourth rectifier diode have substantially a same characteristic as said first rectifier diode.

12. Power supply circuitry in accordance with claim 1, wherein said first rectifier diode is connected to a positive input of said response circuit, and wherein said power supply circuit further comprises:
- a second rectifier diode connected between said receiving means and a negative input of said response circuit, and having substantially a same characteristic as said first rectifier diode, and connected in opposite direction to said first rectifier diode;
- a third rectifier diode connected between additional receiving means for receiving the electromagnetic energy and said positive input of said response circuit, and having substantially a same characteristic as said first rectifier diode, and connected in a same direction as said first rectifier diode; and
- a fourth rectifier diode connected between said additional receiving means and said negative input of said response circuit, and having substantially a same characteristic as said third rectifier diode, and connected in opposite, direction to said third rectifier diode.

13. Power supply circuitry in accordance with claim 1, wherein said receiving means comprises an antenna for receiving the electromagnetic energy in a form of an electromagnetic wave.

14. A transponder comprising:
- receiving means for receiving electromagnetic energy sent from an interrogator;
- a response circuit connected to said receiving means, and for transmitting a signal to the interrogator in response to the electromagnetic energy received; and
- power supply circuitry connected to said receiving means and said response circuit, and for generating DC power to be applied to said response circuit out of the electromagnetic energy received;
- said power supply circuitry comprising:
  - a first rectifier diode having a junction formed by an n type semiconductor region and a p type semiconductor region, and adjusted such that a reverse resistance against a reverse current directed from said n type semiconductor region toward said p type semiconductor region is lower than a forward resistance against a forward current directed from said p type semiconductor region toward said n type semiconductor region;
  - said first rectifier diode being connected between said receiving means and said response circuit;
  - whereby a voltage output from said receiving means received the electromagnetic energy is applied to said first rectifier diode to thereby cause the reverse current to flow through said first rectifier diode, and a resulting DC voltage output from said first rectifier diode causes power to be fed to said response circuit.

15. A transponder in accordance with claim 14, further comprising transmitting means for transmitting the signal to be sent by said response circuit in a form of electromagnetic energy.

* * * * *